(12) United States Patent
Wunsche, III et al.

(10) Patent No.: US 10,872,252 B2
(45) Date of Patent: Dec. 22, 2020

(54) EXTERIOR CAMERA SERVICES FOR VEHICLE-SHARING FLEET

(71) Applicants: DENSO International America, Inc., Southfield, MI (US); DENSO CORPORATION, Kariya (JP)

(72) Inventors: Robert Wunsche, III, Clarkston, MI (US); Mustafa Mahmoud, Northville, MI (US); Feng Xue, Novi, MI (US)

(73) Assignees: DENSO International America, Inc., Southfield, MI (US); DENSO CORPORATION, Kariya (JP)

( * ) Notice: Subject to any disclaimer, the term of this patent is extended or adjusted under 35 U.S.C. 154(b) by 0 days.

(21) Appl. No.: 16/677,013

(22) Filed: Nov. 7, 2019

(65) Prior Publication Data

US 2020/0151467 A1  May 14, 2020

Related U.S. Application Data

(60) Provisional application No. 62/812,073, filed on Feb. 28, 2019, provisional application No. 62/760,613, filed on Nov. 13, 2018.

(51) Int. Cl.
*B60R 11/04* (2006.01)
*G06K 9/00* (2006.01)
(Continued)

(52) U.S. Cl.
CPC .......... *G06K 9/00825* (2013.01); *B60R 11/04* (2013.01); *B60R 25/04* (2013.01);
(Continued)

(58) Field of Classification Search
None
See application file for complete search history.

(56) References Cited

U.S. PATENT DOCUMENTS 9,842,500 B1 * 12/2017 Prasad .................. G08G 1/162
2004/0234109 A1  11/2004 Lemelson et al.
(Continued)

FOREIGN PATENT DOCUMENTS

WO  WO-20150191913 A2  12/2015

OTHER PUBLICATIONS

International Search Report regarding International Application No. PCT/US2019/061149, dated Apr. 17, 2020.
(Continued)

*Primary Examiner* — John F Mortell
(74) *Attorney, Agent, or Firm* — Harness, Dickey & Pierce, P.L.C.

(57) ABSTRACT

A method and system are disclosed and include obtaining sensor data from at least one sensor of a subject vehicle. The method also includes determining whether the sensor data indicates one of (i) a first vehicle has contacted the subject vehicle and (ii) the first vehicle is located within a threshold distance of the subject vehicle. The method also includes selectively activating, in response to one of (i) the first vehicle contacting the subject vehicle and (ii) the first vehicle being located within the threshold distance, at least one camera of the subject vehicle. The method also includes obtaining image data of the first vehicle from the at least one camera. The method also includes transmitting the image data to a remote computing system.

19 Claims, 9 Drawing Sheets

(51) Int. Cl.
*B60R 25/04* (2013.01)
*G08G 1/00* (2006.01)
*B60R 21/00* (2006.01)

(52) U.S. Cl.
CPC ...... *G08G 1/205* (2013.01); *B60R 2021/0027* (2013.01); *B60R 2300/105* (2013.01); *B60R 2300/8073* (2013.01)

(56) References Cited

U.S. PATENT DOCUMENTS

| | | |
|---|---|---|
| 2008/0319604 A1 | 12/2008 | Follmer et al. |
| 2014/0309862 A1 | 10/2014 | Ricci |
| 2015/0271456 A1 | 9/2015 | Kostepen |
| 2015/0370253 A1 | 12/2015 | Gurin |
| 2018/0215344 A1 | 8/2018 | Santora et al. |
| 2018/0321050 A1 | 11/2018 | Chase et al. |
| 2019/0213425 A1* | 7/2019 | Anderson ............... G06Q 40/08 |

OTHER PUBLICATIONS

Written Opinion regarding International Application No. PCT/US2019/061149, dated Apr. 17, 2020.

* cited by examiner

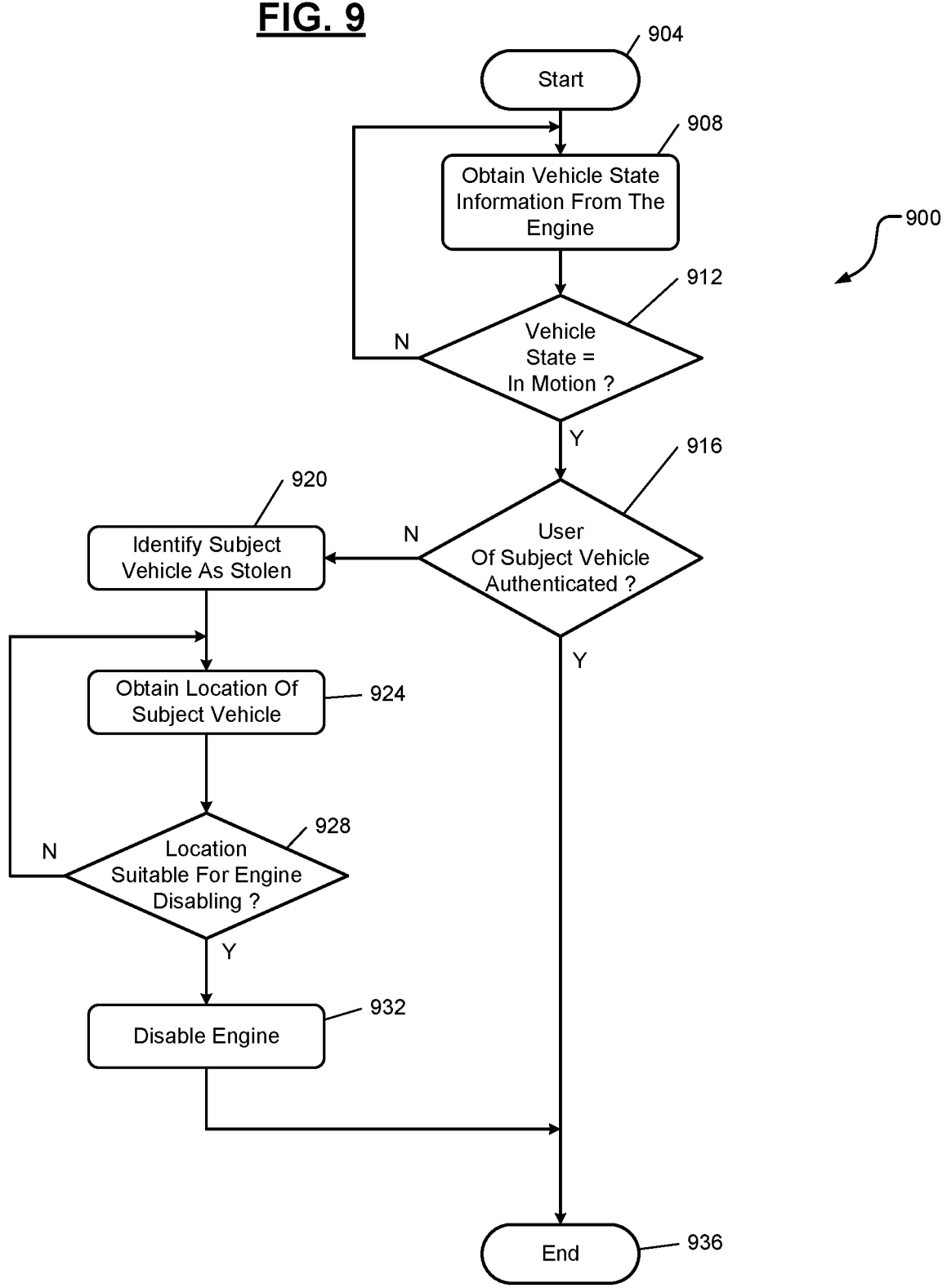

EXTERIOR CAMERA SERVICES FOR VEHICLE-SHARING FLEET

CROSS-REFERENCE TO RELATED APPLICATIONS

This application claims the benefit of U.S. Provisional Application No. 62/760,613, filed on Nov. 13, 2018, and U.S. Provisional Application No. 62/812,073, filed on Feb. 28, 2019. The entire disclosures of each of the above applications are incorporated herein by reference.

FIELD

The present disclosure relates to exterior camera services for a vehicle-sharing fleet.

BACKGROUND

This section provides background information related to the present disclosure and is not necessarily prior art.

Vehicle-sharing fleet managers may have a variety of vehicles that are available to rent for a predefined period of time, such as an hour, using a vehicle-sharing application. Similarly, ride-hailing and ride-sharing fleet managers may have a variety of vehicles that enable users to request a vehicle in order to travel to a specified destination. However, these vehicles lack sufficient and effective exterior camera services.

SUMMARY

This section provides a general summary of the disclosure, and this section is not a comprehensive disclosure of its full scope or all of its features.

A method is disclosed and includes obtaining, using a processor configured to execute instructions stored in a nontransitory computer-readable medium, sensor data from at least one sensor of a subject vehicle. The method also includes determining, using the processor, whether the sensor data indicates one of (i) a first vehicle has contacted the subject vehicle and (ii) the first vehicle is located within a threshold distance of the subject vehicle. The method also includes selectively activating, using the processor and in response to one of (i) the first vehicle contacting the subject vehicle and (ii) the first vehicle being located within the threshold distance, at least one camera of the subject vehicle. The method also includes obtaining, using the processor, image data of the first vehicle from the at least one camera. The method also includes transmitting, using the processor, the image data to a remote computing system.

In some embodiments, the sensor is a global navigation satellite system sensor; and the sensor data represents a location of the subject vehicle.

In some embodiments, determining whether the sensor data indicates that the first vehicle is within a threshold distance of the subject vehicle further comprises: retrieving, using the processor, location data associated with the first vehicle from the remote computing system; determining, using the processor, a distance between the subject vehicle and the first vehicle based on the location of the subject vehicle and the location data associated with the first vehicle; and determining, using the processor, whether the first vehicle is located within the threshold distance of the subject vehicle based on the distance.

In some embodiments, selectively activating the at least one camera of the subject vehicle further comprises: retrieving, using the processor, trajectory data associated with the first vehicle from the remote computing system; identifying, using the processor, a set of the at least one camera based on the location of the first vehicle and the trajectory data; and activating, using the processor, the set of the at least one camera.

In some embodiments, the sensor is an impact sensor; and the sensor data represents an applied force to the subject vehicle.

In some embodiments, selectively activating the at least one camera of the subject vehicle further comprises: determining, using the processor, a contact location of the subject vehicle based on the sensor data; determining, using the processor, a location of the first vehicle based on the contact location; identifying, using the processor, a set of the at least one camera based on the location of the first vehicle; and activating, using the processor, the set of the at least one camera.

In some embodiments, the method further comprises generating, using the remote computing system, a cleanliness score of the first vehicle based on the image data; and generating, using the remote computing system and in response to the cleanliness score being greater than a threshold value, an alert that is configured to indicate that the first vehicle needs to be cleaned.

In some embodiments, the method further comprises determining, using the processor, whether the image data corresponds to image information of a vehicle-sharing account associated with the subject vehicle; and identifying, using the processor and in response to (i) the image data not corresponding to the image information of the vehicle-sharing account and (ii) a vehicle state of the subject vehicle being associated with a first condition, the subject vehicle as stolen.

In some embodiments, the method further comprises obtaining, using the processor, a location of a user; selectively activating, using the processor and in response to the user being located within a second threshold distance of the subject vehicle, at least one camera of the subject vehicle; obtaining, using the processor, image data associated with an exterior of the vehicle from the at least one camera; and activating, using the processor and in response to the image data indicating that the user is approaching the subject vehicle, an engine of the subject vehicle.

In some embodiments, the at least one camera is located on an exterior of the subject vehicle.

A system is also disclosed and includes a processor configured to execute instructions stored in a nontransitory computer-readable medium. The instructions include obtaining sensor data from at least one sensor of a subject vehicle. The instructions also include determining whether the sensor data indicates one of (i) a first vehicle has contacted the subject vehicle and (ii) the first vehicle is located within a threshold distance of the subject vehicle. The instructions also include, in response to one of (i) the first vehicle contacting the subject vehicle and (ii) the first vehicle being located within the threshold distance, selectively activating at least one camera of the subject vehicle. The instructions also include obtaining image data of the first vehicle from the at least one camera. The instructions also include transmitting, using the processor, the image data to a remote computing system.

In some embodiments, the sensor is a global navigation satellite system sensor; and the sensor data represents a location of the subject vehicle.

In some embodiments, determining whether the sensor data indicates that the first vehicle is within a threshold distance of the subject vehicle further comprises: retrieving location data associated with the first vehicle from the remote computing system; determining a distance between the subject vehicle and the first vehicle based on the location of the subject vehicle and the location data associated with the first vehicle; and determining whether the first vehicle is located within the threshold distance of the subject vehicle based on the distance.

In some embodiments, selectively activating the at least one camera of the subject vehicle further comprises: retrieving trajectory data associated with the first vehicle from the remote computing system; identifying a set of the at least one camera based on the location of the first vehicle and the trajectory data; and activating the set of the at least one camera.

In some embodiments, the sensor is an impact sensor; and the sensor data represents an applied force to the subject vehicle.

In some embodiments, selectively activating the at least one camera of the subject vehicle further comprises: determining a contact location of the subject vehicle based on the sensor data; determining a location of the first vehicle based on the contact location; identifying a set of the at least one camera based on the location of the first vehicle; and activating the set of the at least one camera.

In some embodiments, the remote computing system is configured to: generate a cleanliness score of the first vehicle based on the image data; and in response to the cleanliness score being greater than a threshold value, generate an alert that is configured to indicate that the first vehicle needs to be cleaned.

In some embodiments, the instructions further comprise determining whether the image data corresponds to image information of a vehicle-sharing account associated with the subject vehicle; and in response to (i) the image data not corresponding to the image information of the vehicle-sharing account and (ii) a vehicle state of the subject vehicle being associated with a first condition, identifying the subject vehicle as stolen.

In some embodiments, the instructions further comprise obtaining a location of a user; in response to the user being located within a second threshold distance of the subject vehicle, selectively activating at least one camera of the subject vehicle; obtaining image data associated with an exterior of the vehicle from the at least one camera; and in response to the image data indicating that the user is approaching the subject vehicle, activating an engine of the subject vehicle.

In some embodiments, the at least one camera is located on an exterior of the subject vehicle.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and the drawings are not intended to limit the scope of the present disclosure.

FIGS. 6-9 illustrate example control algorithms according to the present disclosure.

Corresponding reference numerals indicate corresponding parts throughout the several views of the drawings.

DETAILED DESCRIPTION

Figure 1:
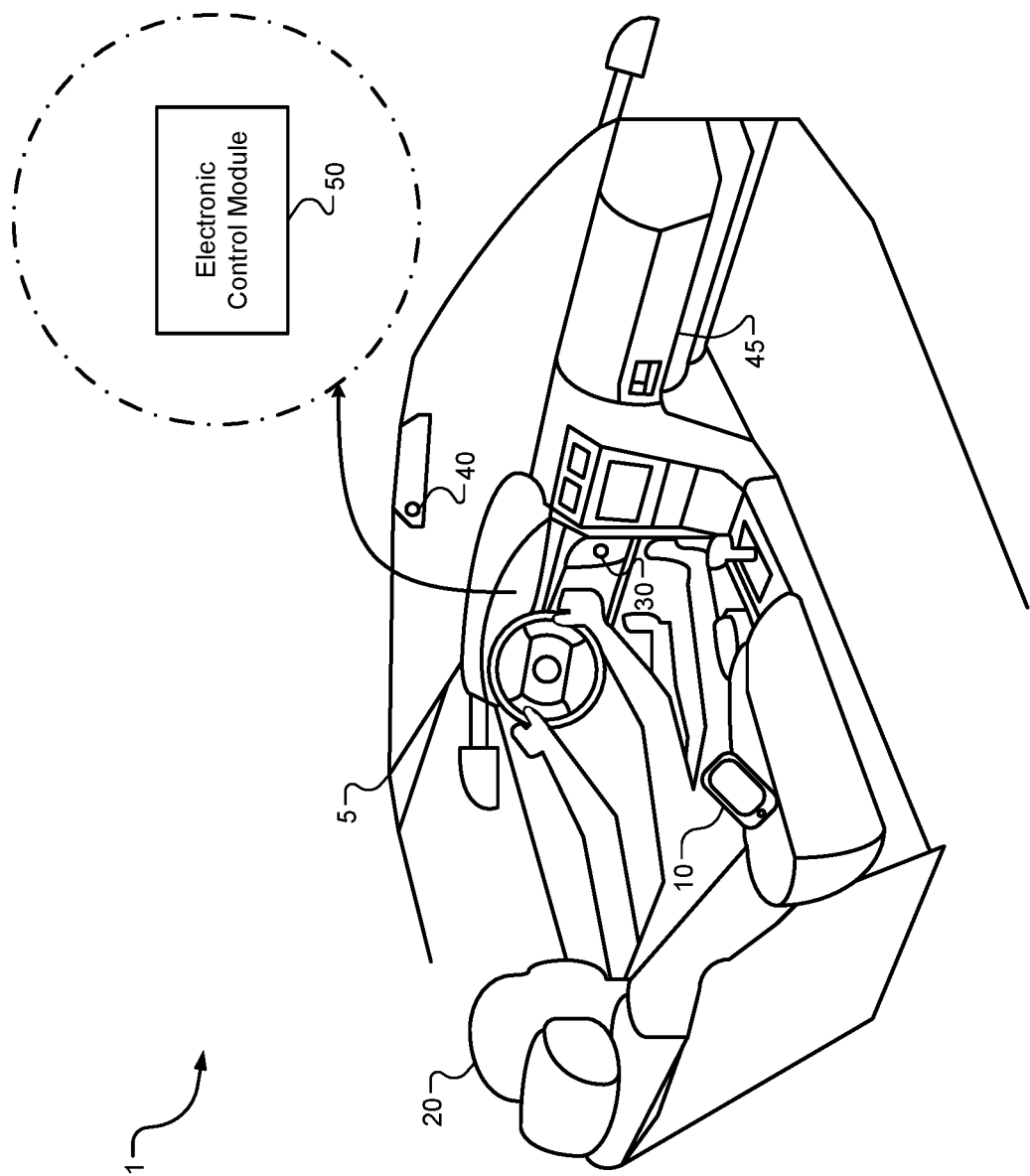
FIGS. 1-4 are example diagrams of a vehicle according to the present disclosure.

Example embodiments will now be described more fully with reference to the accompanying drawings.

With reference to FIGS. 1-4, example illustrations of a system 1 are shown. The system 1 may include a subject vehicle 5, a portable device 10, an ignition switch 30, an interior camera 40, and a storage compartment 45. In one embodiment, the subject vehicle 5 is part of a vehicle-sharing fleet. Additionally or alternatively, the subject vehicle 5 may be part of a ride-sharing fleet and/or a ride-hailing fleet.

The subject vehicle 5 may include an electronic control module (ECM) 50. As an example, the ECM 50 may be located behind a dashboard 48 of the subject vehicle 5. While one interior camera 40 is shown in this example, any number of interior cameras 40 can be included within the subject vehicle 5. Moreover, while the interior camera 40 is located on a rear-view mirror in FIG. 1, the interior camera 40 may be positioned at any suitable location within the interior of the subject vehicle 5.

The portable device 10 may be any device that is configured to transmit and receive wireless signals, such as a smartphone, smartwatch, wearable electronic device, key fob, tablet device, laptop device, a Bluetooth-enabled device, or other device associated with a user 20 and capable of wireless communication. As described below in further detail, the portable device 10 is configured to generate vehicle-sharing requests and define personalized vehicle settings via an application executing on the portable device 10. Furthermore, the portable device 10 is configured to receive a digital key associated with the subject vehicle 5 from a fleet manager computing system (shown below) in response to transmitting the vehicle-sharing request. The digital key enables the user 20 to unlock and enter the subject vehicle 5. Accordingly, the portable device 10 may include at least one processor that is configured to execute instructions stored in a nontransitory computer-readable medium, such as a random-access memory (RAM) and/or a read-only memory (ROM).

The interior camera 40 may be configured to obtain image data of the user 20. Based on the image data obtained by the interior camera 40 and a vehicle-sharing account associated with the user 20, the ECM 50 may be configured to authenticate the user 20. In order to carry out the functionality of algorithms described herein, the ECM 50 may include at least one processor that is configured to execute instructions stored in a nontransitory computer-readable medium, such as a random-access memory (RAM) and/or a read-only memory (ROM). The ECM 50 may be in communication with the interior camera 40 via a hardware link, such as a local interconnect network (LIN) cable, a controller area network (CAN) cable, an Ethernet cable, or any other suitable hardwire link. In other embodiments, the ECM 50 may be in communication with the interior camera 40 via any suitable telemetric link, such as a Bluetooth link (e.g., Bluetooth low-energy), a Wi-Fi or Wi-Fi direct link, a cellular link, etc. Likewise, the ECM 50 may be in communication with the portable device 10 via any suitable telemetric link, such as a Bluetooth link (e.g., Bluetooth low-energy), a Wi-Fi or Wi-Fi direct link, a cellular/LTE link, etc.

In response to the ECM 50 authenticating the user 20, the ECM 50 may enable the user 20 to activate the subject vehicle 5. As an example, the ECM 50 may enable the user 20 to retrieve keys stored in the storage compartment 45 (e.g., glove box) of the subject vehicle 5 for subsequent placement and rotation of the ignition switch 30. Alternatively, the ignition switch 30 may be implemented by a button, and as such, the subject vehicle 5 may be activated in response to pressing the button and the portable device 10 being located within an activation range of the subject vehicle 5. Additionally, in response to the ECM 50 authenticating the user 20, the ECM 50 may adjust various vehicle settings according to the vehicle-sharing account associated with the user 20.

Figure 2:
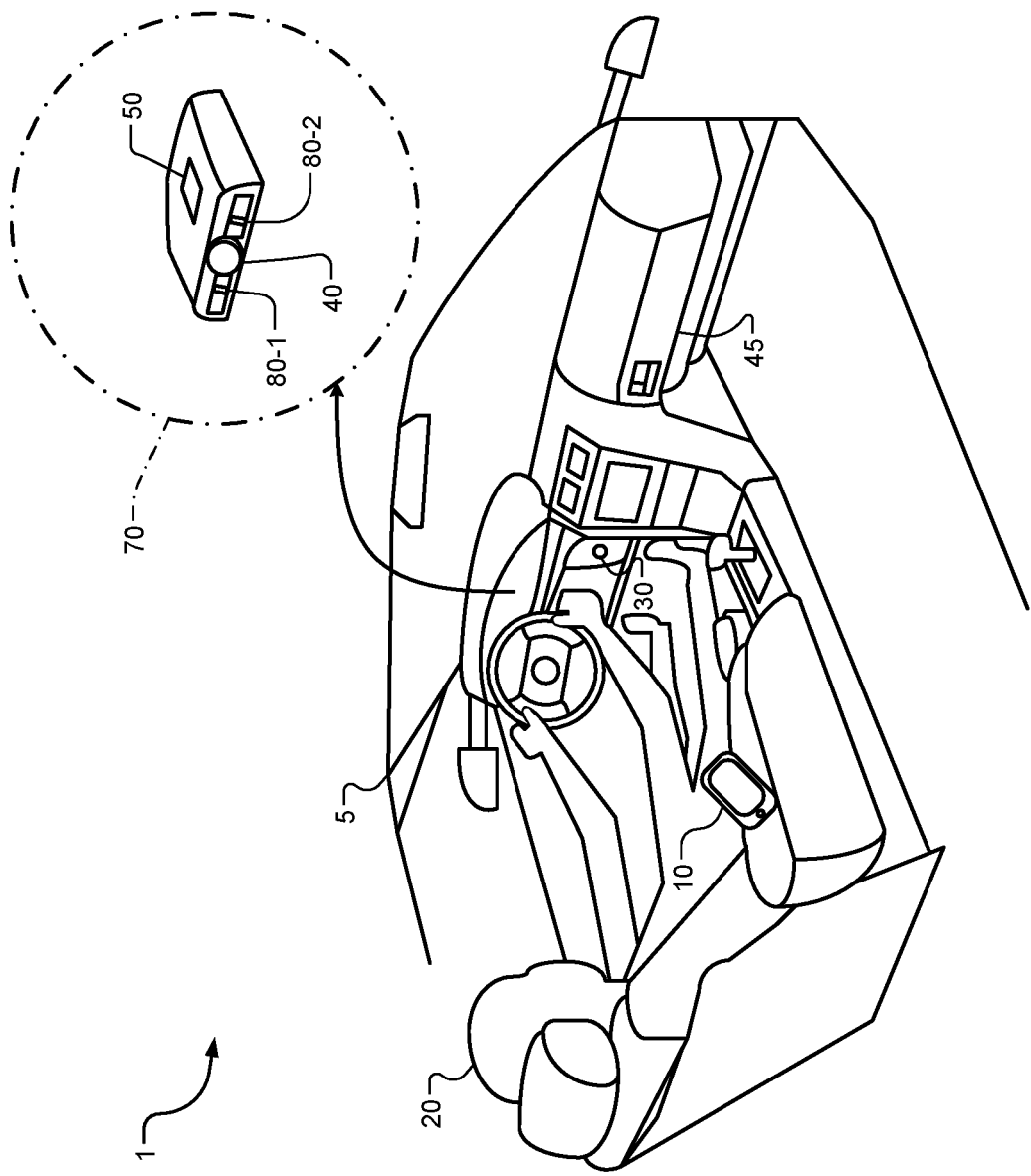

In other embodiments and as shown in FIG. 2, the dashboard may also include a driver status monitor (DSM) 70, which may be mounted over a steering column connected to the steering wheel of the subject vehicle 5. The DSM 70 may include infrared (IR) sensors 80-1, 80-2 (collectively referred to as IR sensors 80), the interior camera 40, and the ECM 50. The DSM 70 may be configured to obtain facial feature data of the user 20. As an example, the ECM 50 may obtain facial feature data sensed by the IR sensors 80 and the interior camera 40, including images of the face and head of the user 20. Based on the facial feature data, the ECM 50 is configured to, for example, perform a variety of image processing and/or computer vision techniques for facial recognition, as understood by one of ordinary skill in the art.

While the embodiments shown in FIGS. 1-2 include one interior camera 40, in other embodiments, any number of interior cameras 40 may be included within the subject vehicle 5. Moreover, while the interior camera 40 is included on a rear-view mirror in FIG. 1 and the DSM 70 in FIG. 2, the interior camera 40 may be positioned at any suitable location of the interior of the subject vehicle 5.

Figure 3:
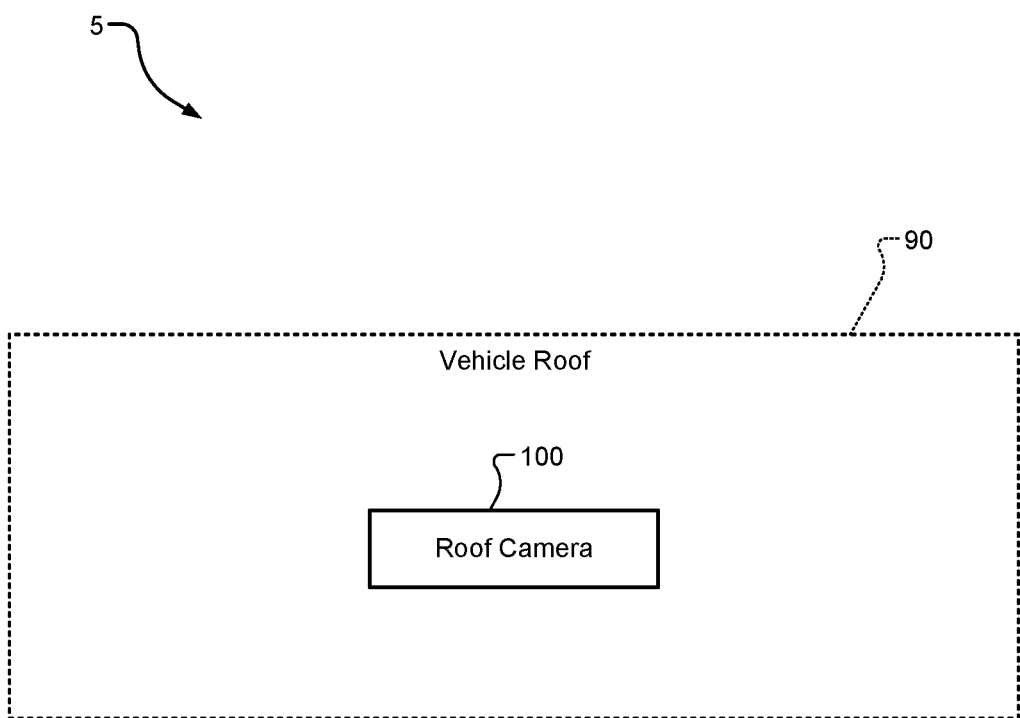

Additionally, a vehicle roof 90 (e.g., a headliner) of the subject vehicle 5 may include a roof camera 100, as shown in FIG. 3. While this embodiment illustrates one roof camera 100, in other embodiments, any number of roof cameras 100 may be included on the vehicle roof 90. The roof camera 100 is configured to obtain image data representing the interior of the subject vehicle 5. The ECM 50 may be in communication with the roof camera 100 via a hardware link, such as a LIN cable, an Ethernet cable, or any other suitable hardwire link. In other embodiments, the ECM 50 may be in communication with the roof camera 100 via any suitable telemetric link, such as a Bluetooth link (e.g., Bluetooth low-energy), a Wi-Fi or Wi-Fi direct link, a cellular link, etc.

Figure 4:
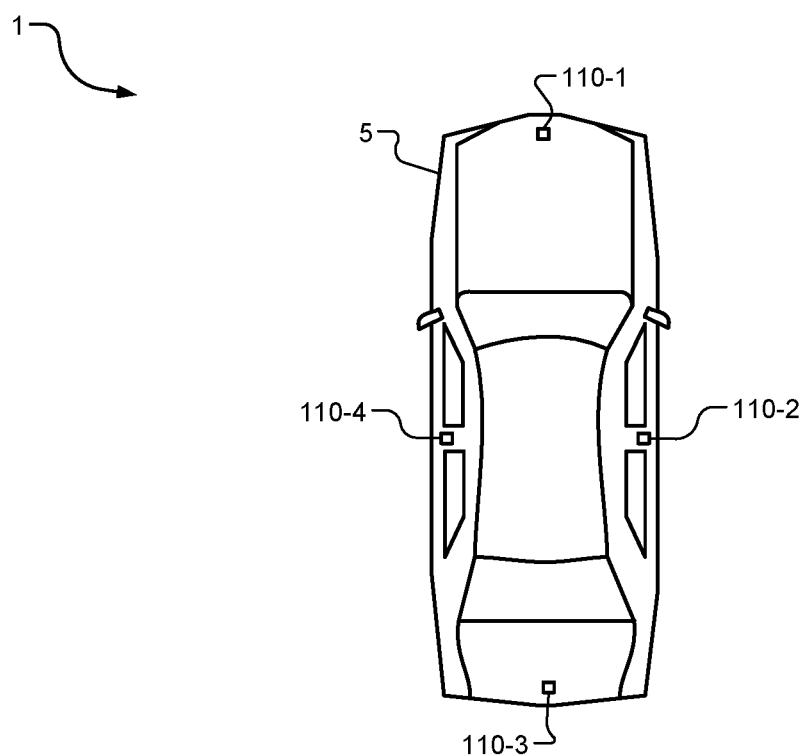

Additionally, the subject vehicle 5 may include a plurality of exterior cameras 110-1, 110-2, 110-3, 110-4 (collectively referred to as exterior cameras 110), as shown in FIG. 4. While this embodiment illustrates four exterior cameras 110, in other embodiments, the subject vehicle 5 may include any number of exterior cameras 110, and the exterior cameras 110 may be located at any suitable location on an exterior of the subject vehicle 5. Based on the image data obtained by the exterior cameras 110, the ECM 50 is configured to execute, for example, an impact detection algorithm, a passive visual inspection algorithm, a remote start algorithm, and an engine disable algorithm, as described below in further detail with reference to FIGS. 5-9. Additionally, the ECM 50 may be configured to authenticate the user 20 based on the image data obtained by the exterior cameras 110 and the vehicle-sharing account associated with the user 20. The ECM 50 may be in communication with the exterior cameras 110 via a hardware link, such as a LIN cable, a CAN cable, an Ethernet cable, or any other suitable hardwire link. In other embodiments, the ECM 50 may be in communication with the exterior cameras 110 via any suitable telemetric link, such as a Bluetooth link (e.g., Bluetooth low-energy), a Wi-Fi or Wi-Fi direct link, a cellular link, etc.

Figure 5:
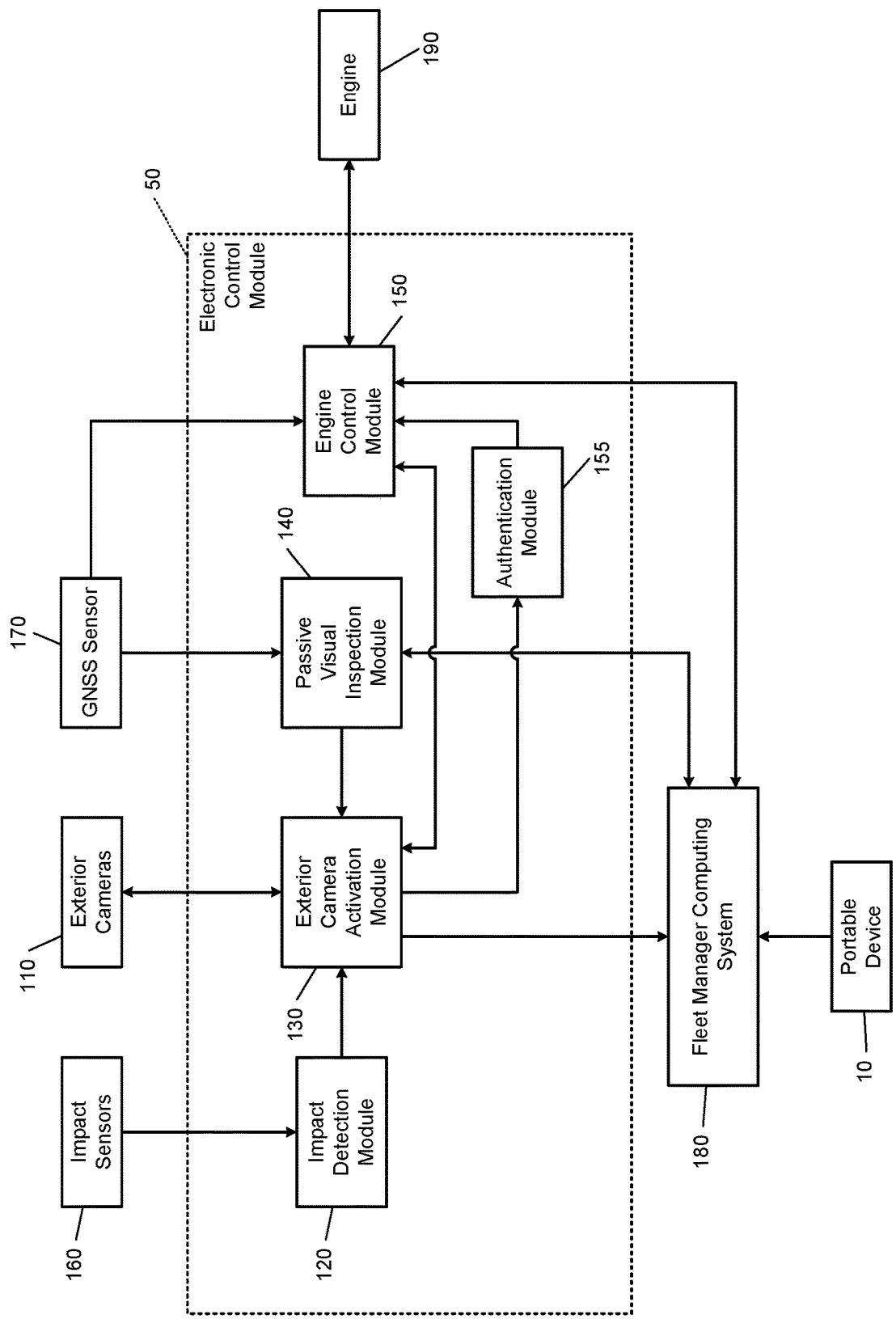
FIG. 5 illustrates a detailed example functional block diagram of an electronic control module of the vehicle according to the present disclosure.

With reference to FIG. 5, a detailed illustration of the ECM 50 is shown. The ECM 50 may include an impact detection module 120, an exterior camera activation module 130, a passive visual inspection module 140, an engine control module 150, and an authentication module 155. The modules of the ECM 50 may be implemented by one or more processors that are configured to execute instructions stored in a non-transitory computer-readable medium, such as a RAM and/or ROM.

The impact detection module 120 is configured to perform the impact detection algorithm described below with reference to FIG. 6. The impact detection algorithm may be performed while the subject vehicle 5 is in operation or when the subject vehicle 5 is off and stationary. In one embodiment, the impact detection module 120 obtains data from impact sensors 160, which may be implemented by acceleration sensors and/or pressure sensors. Based on the data, the impact detection module 120 may determine whether another vehicle or object has collided with the subject vehicle 5. As an example, if the impact sensors 160 are implemented by acceleration sensors, and the acceleration sensors generate data indicating a large and rapid acceleration change in only axis, then the impact detection module 120 may determine that another vehicle has collided with subject vehicle 5. As another example, if the impact sensors 160 are implemented by pressure sensors, and the pressure sensors generate data indicating a large and sudden amount of force, then the impact detection module 120 may determine that another vehicle has collided with subject vehicle 5.

In response to the impact detection module 120 detecting a collision, the impact detection module 120 may determine the location of the collision based on the data received from the impact sensors 160. The impact detection module 120 may communicate the determined location to the exterior camera activation module 130, which may then determine which of the exterior cameras 110 are suitable for obtaining an image of the vehicle/object. Subsequently, the exterior camera activation module 130 may activate the identified at least one exterior cameras 110 and obtain image data associated with the vehicle/object (e.g., the selected exterior cameras 110 may obtain an image of the vehicle and/or other identifying characteristics of the vehicle, such as a license plate of the vehicle). The image data may then be provided to a fleet manager computing system 180 for post-processing and/or subsequent remedial actions (e.g., an operator of the fleet manager computing system 180 may call a policing authority if the image data indicates that a vehicle has struck the subject vehicle 5). In order to carry out the functionality described herein, the fleet manager computing system 180 may include one or more processors that are configured to execute instructions stored in a non-transitory computer-readable medium, such as a RAM and/or ROM.

The passive visual inspection module 140 is configured to perform the passive visual inspection algorithm described below with reference to FIG. 7. In one embodiment, the passive visual inspection module 140 determines a location of the subject vehicle 5 based on location data obtained from a global navigation satellite system (GNSS) sensor 170. The determined location of the subject vehicle 5 may be communicated to the fleet manager computing system 180, which may be configured to generate an entry in a database corresponding to the location of the subject vehicle 5. Likewise, the fleet manager computing system 180 may generate entries that include location information for each vehicle in the vehicle-sharing fleet.

The passive visual inspection module 140 may receive the location information of other vehicles in the vehicle-sharing fleet from the fleet manager computing system 180. Based on the location information of the other vehicles and the subject vehicle 5, the passive visual inspection module 140 may determine whether the subject vehicle 5 is located near any one of the other vehicles in the vehicle-sharing fleet. If the subject vehicle 5 is located within a threshold distance of at least one of the other vehicles of the vehicle-sharing fleet, the passive visual inspection module 140 may communicate the location information of the subject vehicle 5 and the at least one other vehicle to the exterior camera activation module 130. Based on this location information, the exterior camera activation module 130 may activate the identified at least one exterior cameras 110 and obtain image data associated with the at least one other vehicle. The image data may then be provided to a fleet manager computing system 180 for post-processing and/or subsequent remedial action.

As a specific example, the passive visual inspection module 140 may determine that a vehicle of the vehicle-sharing fleet is located within the threshold distance (e.g., 0.25 miles) of the subject vehicle 5. Furthermore, the passive visual inspection module 140 may determine that the location information of the identified vehicle and the subject vehicle 5 indicates that the vehicles are traveling in opposite directions on the same roadway at different speeds (e.g., the identified vehicle is traveling north on Park Street at 30 mph, and the subject vehicle 5 is traveling south on Park Street at 25 mph). Based on the distance between the vehicles and the velocity of the vehicles, the passive visual inspection module 140 and/or exterior camera activation module 130 may determine where and when the vehicles may intersect and which exterior cameras 110 are suitable for obtaining image data of the identified vehicle. Subsequently, the fleet manager computing system 180, using a machine learning algorithm or other similar algorithm, may process the image data and determine, for example, that the identified vehicle needs to be cleaned after the current vehicle-sharing session is completed and prior to any future vehicle-sharing sessions.

The engine control module 150 is configured to perform the remote start algorithm described below with reference to FIG. 8. In response to receiving a vehicle-sharing request, the fleet manager computing system 180 may determine a location of the user 20 based on location information associated with the portable device 10 and the user's location to the engine control module 150. Additionally, the engine control module 150 may determine the location of the subject vehicle 5 based on location data obtained from the GNSS sensor 170. If the location of the user 20 is within a threshold distance of the subject vehicle 5, the engine control module 150 may instruct the exterior camera activation module 130 to activate the exterior cameras 110 in order to obtain image data representing the exterior of the subject vehicle 5. If the image data indicates that the user 20 is approaching the subject vehicle 5 and/or the authentication module 155 authenticates the user 20 based on the image data and image information associated with the user's vehicle-sharing account, the engine control module 150 may remotely activate an engine 190 of the subject vehicle 5.

Additionally, the engine control module 150 is configured to perform the engine disable algorithm described below with reference to FIG. 9. In one embodiment, the engine control module 150 is configured to receive vehicle state information from the engine 190. Additionally, the engine control module 150 is configured to obtain a result of the authentication module 155 (i.e., whether the user 20 was authenticated). Based on the result and the vehicle state information, the engine control module 150 may be configured to determine if the subject vehicle 5 is stolen and/or being operated by an unauthorized user. In response to determining the subject vehicle 5 is stolen and/or being operated by an unauthorized user, the engine control module 150 may disable the engine 190, as described below in further detail.

Figure 6:
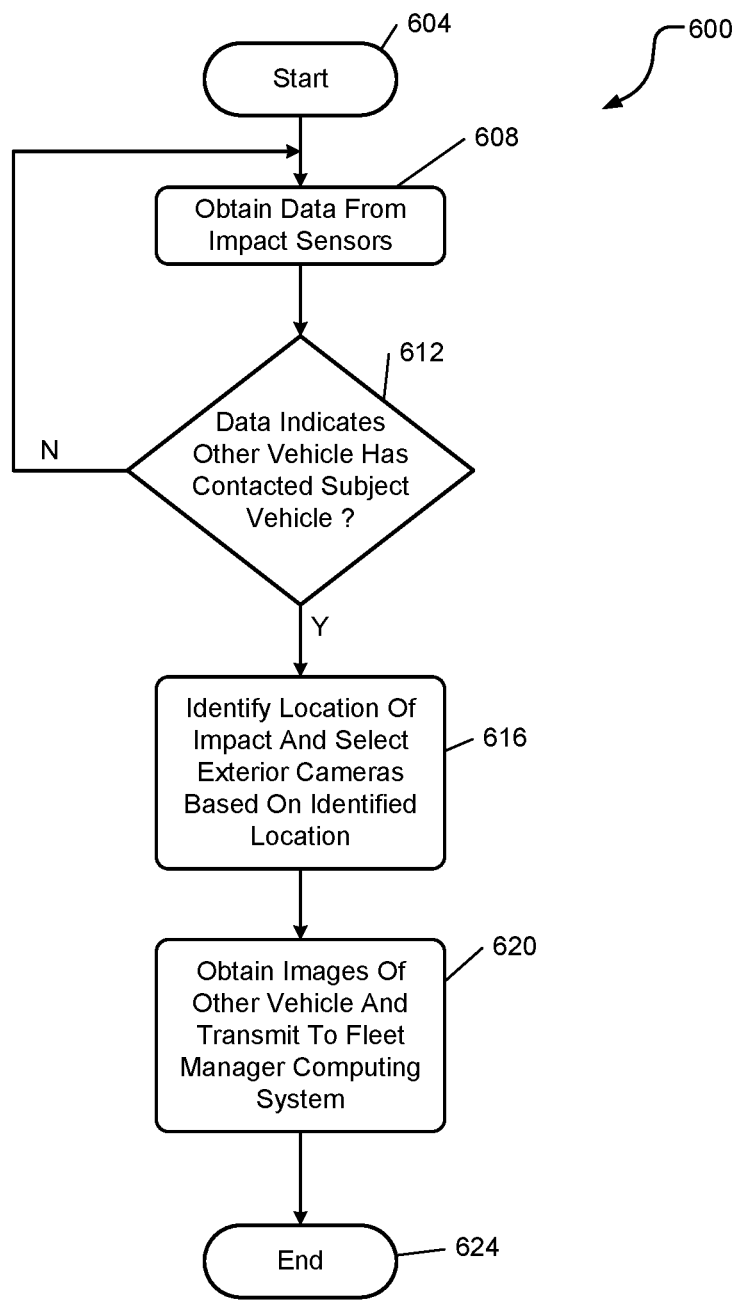

With reference to FIG. 6, a flowchart illustrating a control algorithm 600 for performing the impact detection algorithm is shown. The control algorithm 600 begins at 604 when, for example, the subject vehicle 5 is turned on or is turned off and stationary. At 608, the control algorithm 600 obtains, using the ECM 50, data from the impact sensors 160. At 612, the control algorithm 600 determines, using the ECM 50, whether the data indicates that another vehicle (or object) has contacted the subject vehicle 5. If so, the control algorithm 600 proceeds to 616; otherwise, the control algorithm 600 proceeds to 608. At 616, the control algorithm 600 identifies, using the ECM 50, the location of the impact and selects at least one of the exterior cameras 110 based on the location of the impact. As an example, if the ECM 50 determines that the collision occurred on a driver-side of the subject vehicle 5, the ECM 50 may activate any one of the exterior cameras 110 that are configured to obtain image data near the driver-side of the subject vehicle 5. At 620, the control algorithm 600 obtains, using the ECM 50, image data from the selected at least one exterior cameras 110 and transmits the image data to the fleet manager computing system 180 for post-processing, as described above. The control algorithm 600 then ends at 624.

Figure 7:
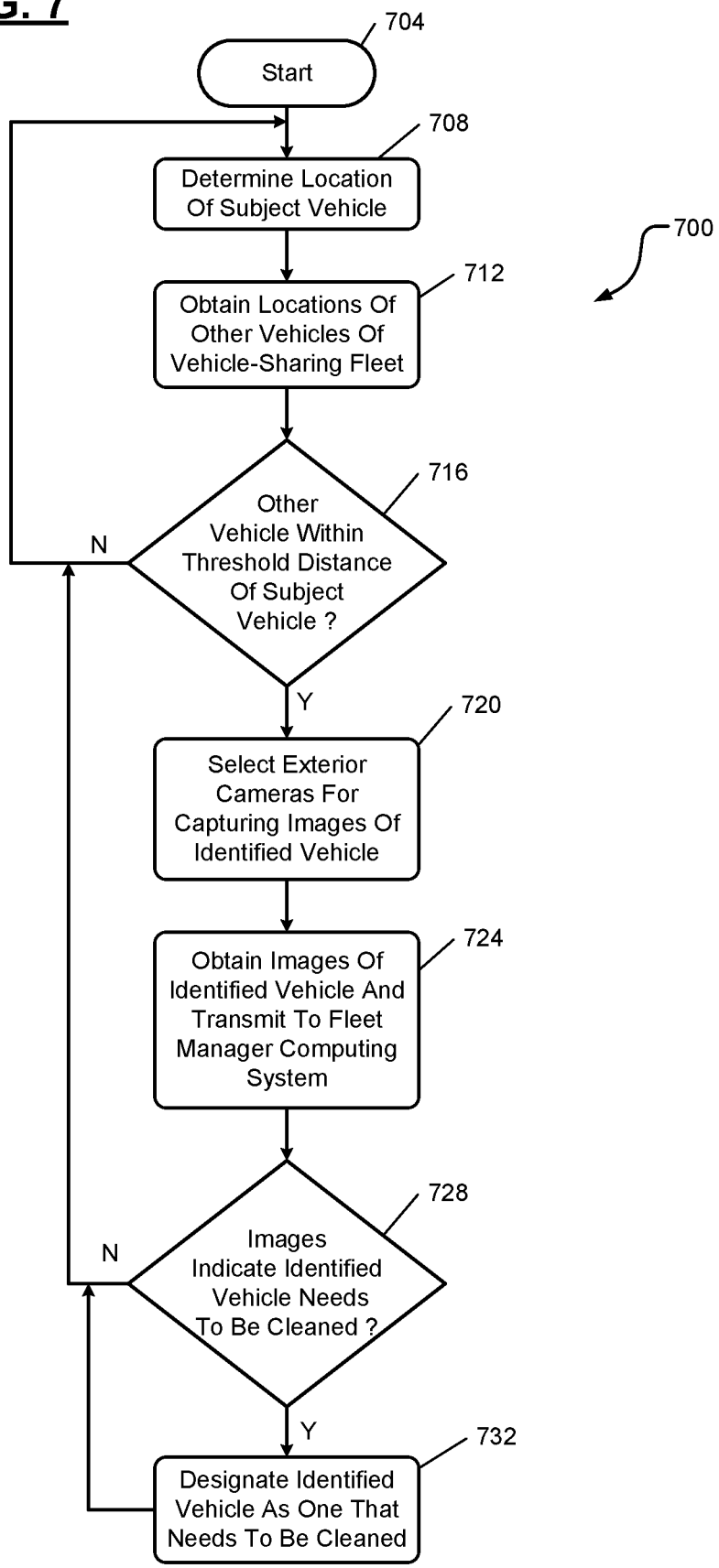

With reference to FIG. 7, a flowchart illustrating a control algorithm 700 for performing the passive visual inspection algorithm is shown. The control algorithm 700 begins at 704 when, for example, the subject vehicle 5 is turned on. At 708, the control algorithm 700 determines, using the ECM 50, the location of the subject vehicle 5. At 712, the control algorithm 700 obtains, using the ECM 50, the locations of other vehicles of the vehicle-sharing fleet from the fleet manager computing system 180. At 716, the control algorithm 700 determines, using the ECM 50, whether one of the other vehicles of the vehicle-sharing fleet is located within a threshold distance of the subject vehicle 5. If so, the control algorithm 700 proceeds to 720; otherwise, the control algorithm 700 proceeds to 708.

At 720, the control algorithm 700 selects, using the ECM 50, at least one of the exterior cameras 110 that are suitable for obtaining images of the identified vehicle. As described above, the ECM 50 may select the at least one exterior cameras 110 based on the distance between the vehicles and the velocity of the vehicles. At 724, the control algorithm 700 obtains, using the ECM 50, images of the identified vehicle from the at least one exterior cameras 110 and transmits the images to the fleet manager computing system 180. At 728, the control algorithm 700 determines, using the fleet manager computing system 180 and/or operator thereof, whether the images indicate that the identified vehicle needs servicing. As an example, the fleet manager computing system 180 may generate, using a machine learning algorithm or other similar algorithm, a cleanliness score based on the image data associated with the identified vehicle. If the cleanliness score is greater than a threshold value, the fleet manager computing system 180 and/or operator thereof may determine that the identified vehicle needs to be cleaned. If the image data indicates that the identified vehicle needs to be cleaned, the control algorithm 700 proceeds to 732; otherwise, the control algorithm 700 proceeds to 708.

At 732, the control algorithm 700 designates, using the fleet manager computing system 180, the identified vehicle as one that needs to be cleaned and then proceeds to 708. As a specific example example, the fleet manager computing system 180 may flag the identified vehicle as one that needs to be cleaned after the current vehicle-sharing session is completed and prior to any future vehicle-sharing sessions.

Figure 8:
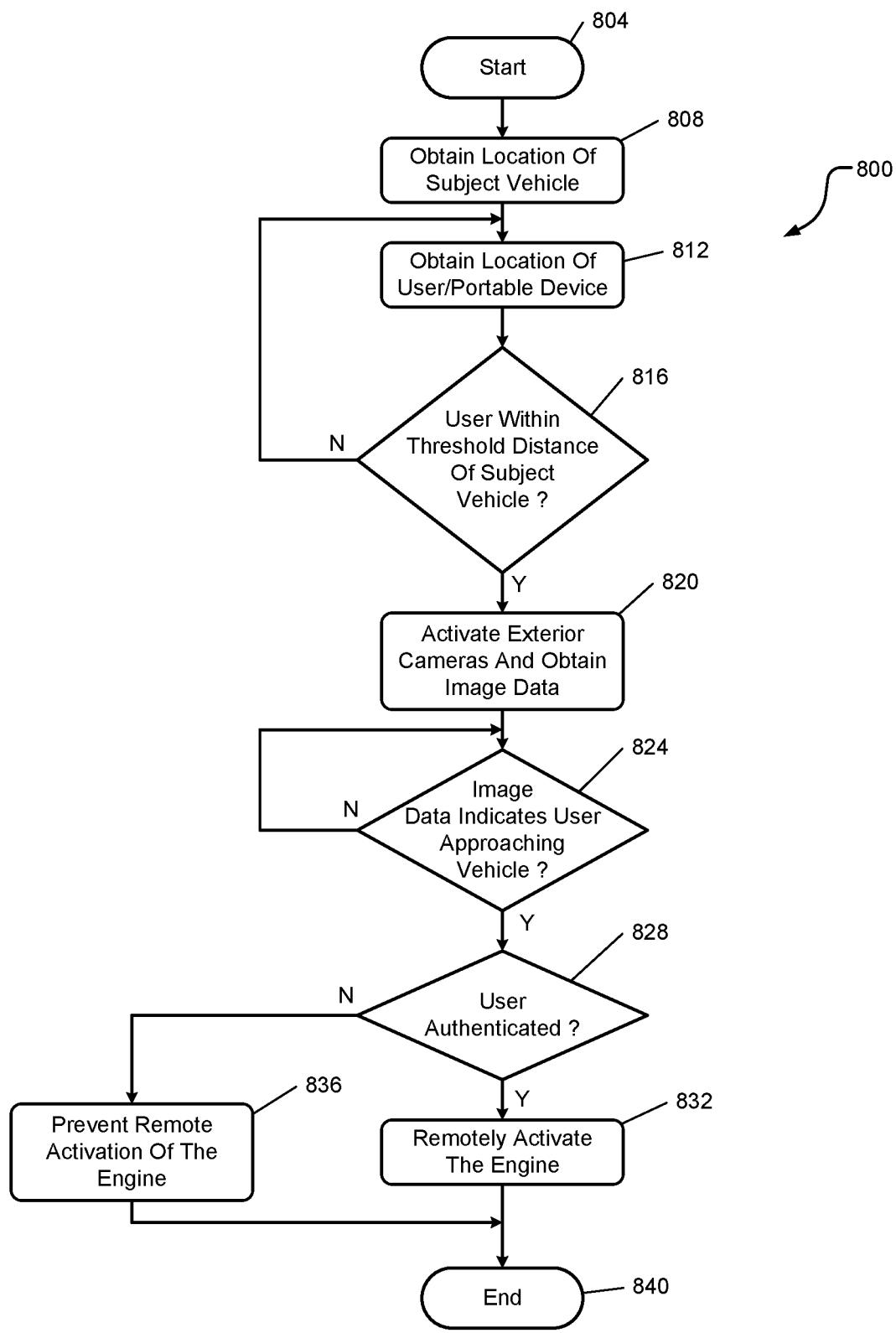

With reference to FIG. 8, flowchart illustrating a control algorithm 800 for performing the remote start algorithm is shown. The control algorithm 800 begins at 804 when, for example, when the fleet manager computing system 180 receives a vehicle-sharing request and assigns the subject vehicle 5 to the user 20. At 808, the control algorithm 800 obtains, using the ECM 50, a location of the subject vehicle 5. At 812, the control algorithm 800 obtains, using the ECM 50, a location of the user 20 and/or the portable device 10. At 816, the control algorithm 800 determines, using the ECM 50, whether the user 20 is within a threshold distance of the subject vehicle 5. If so, the control algorithm 800 proceeds to 820; otherwise, the control algorithm 800 proceeds to 812.

At 820, the control algorithm 800 activates, using the ECM 50, the exterior cameras 110 and obtains image data from the exterior cameras 110. At 824, the control algorithm 800 determines, using the ECM 50, whether the image data indicates that the user 20 is approaching the subject vehicle 5. If so, the control algorithm 800 proceeds to 828; otherwise, the control algorithm 800 remains at 824 until the ECM 50 determines that the image data indicates that the user 20 is approaching the subject vehicle 5. At 828, the control algorithm 800 determines whether the user 20 has been authenticated. If so, the control algorithm 800 proceeds to 832 and remotely activates the engine 190; otherwise, the control algorithm 800 proceeds to 836 and prevents the remote activation of the engine 190. At 840, the control algorithm 800 ends.

With reference to FIG. 9, a flowchart illustrating a control algorithm 900 for performing the engine disable algorithm is shown. The control algorithm 900 begins at 904 when, for example, the subject vehicle 5 is turned on. At 908, the control algorithm 900 obtains, using the ECM 50, vehicle state information from the engine 190. As an example, the vehicle state information may indicate that the subject vehicle 5 is idling or is in motion. At 912, the control algorithm 900 determines, using the ECM 50, whether the vehicle state information indicates that the subject vehicle 5 is in motion. If so, the control algorithm 900 proceeds to 916; otherwise, the control algorithm 900 proceeds to 908. At 916, the control algorithm 900 determines, using the ECM 50, whether the user 20 of the subject vehicle 5 was authenticated. As an example, the ECM 50 may determine that the user 20 was authenticated if the image data obtained from the exterior cameras 110 corresponds to image information associated with the vehicle-sharing account of the user 20, as described above. If the user 20 was authenticated, the control algorithm 900 proceeds to 936; otherwise, the control algorithm 900 proceeds to 920.

At 920, the control algorithm 900 identifies, using the ECM 50, the subject vehicle as stolen. At 924, the control algorithm 900 obtains, using the ECM 50, a location of the subject vehicle 5. At 928, the control algorithm 900 determines, using the ECM 50, whether the location of the subject vehicle 5 is suitable for disabling the engine 190. As an example, locations that are not suitable may be locations that are unsafe for disabling the engine 190, such as an interstate highway and/or other roads that are greater than a threshold speed limit and/or have a traffic density that is greater than a threshold value. If the location is suitable, the control algorithm 900 proceeds to 932; otherwise, the control algorithm 900 proceeds to 924. At 932, the control algorithm 900 disables, using the ECM 50, the engine 190 and then ends at 936.

The present disclosure provides a method that includes obtaining, using a processor configured to execute instructions stored in a nontransitory computer-readable medium, sensor data from at least one sensor of a subject vehicle, determining, using the processor, whether the sensor data indicates one of (i) a first vehicle has contacted the subject vehicle and (ii) the first vehicle is located within a threshold distance of the subject vehicle, selectively activating, using the processor and in response to one of (i) the first vehicle contacting the subject vehicle and (ii) the first vehicle being located within the threshold distance, at least one camera of the subject vehicle, obtaining, using the processor, image data of the first vehicle from the at least one camera, and transmitting, using the processor, the image data to a remote computing system.

In other features, the sensor is a global navigation satellite system sensor; and the sensor data represents a location of the subject vehicle.

In other features, determining whether the sensor data indicates that the first vehicle is within a threshold distance of the subject vehicle further includes retrieving, using the processor, location data associated with the first vehicle from the remote computing system, determining, using the processor, a distance between the subject vehicle and the first vehicle based on the location of the subject vehicle and the location data associated with the first vehicle, and determining, using the processor, whether the first vehicle is located within the threshold distance of the subject vehicle based on the distance.

In other features, selectively activating the at least one camera of the subject vehicle further includes retrieving, using the processor, trajectory data associated with the first vehicle from the remote computing system, identifying, using the processor, a set of the at least one camera based on the location of the first vehicle and the trajectory data, and activating, using the processor, the set of the at least one camera.

In other features, the sensor is an impact sensor and the sensor data represents an applied force to the subject vehicle.

In other features, selectively activating the at least one camera of the subject vehicle further includes determining, using the processor, a contact location of the subject vehicle based on the sensor data, determining, using the processor, a location of the first vehicle based on the contact location, identifying, using the processor, a set of the at least one camera based on the location of the first vehicle, and activating, using the processor, the set of the at least one camera.

In other features, the method further includes generating, using the remote computing system, a cleanliness score of the first vehicle based on the image data, and generating, using the remote computing system and in response to the cleanliness score being greater than a threshold value, an alert that is configured to indicate that the first vehicle needs to be cleaned.

In other features, the method further includes determining, using the processor, whether the image data corresponds to image information of a vehicle-sharing account associated with the subject vehicle, and identifying, using the processor and in response to (i) the image data not corresponding to the image information of the vehicle-sharing account and (ii) a vehicle state of the subject vehicle being associated with a first condition, the subject vehicle as stolen.

In other features, the method further includes obtaining, using the processor, a location of a user, selectively activating, using the processor and in response to the user being located within a second threshold distance of the subject vehicle, at least one camera of the subject vehicle, obtaining, using the processor, image data associated with an exterior of the vehicle from the at least one camera, and activating, using the processor and in response to the image data indicating that the user is approaching the subject vehicle, an engine of the subject vehicle.

In other features, at least one camera is located on an exterior of the subject vehicle.

The present disclosure also provides a system that includes a processor configured to execute instructions stored in a nontransitory computer-readable medium. The instructions include obtaining sensor data from at least one sensor of a subject vehicle, determining whether the sensor data indicates one of (i) a first vehicle has contacted the subject vehicle and (ii) the first vehicle is located within a threshold distance of the subject vehicle, in response to one of (i) the first vehicle contacting the subject vehicle and (ii) the first vehicle being located within the threshold distance, selectively activating at least one camera of the subject vehicle, obtaining image data of the first vehicle from the at least one camera, and transmitting, using the processor, the image data to a remote computing system.

In other features, the sensor is a global navigation satellite system sensor; and the sensor data represents a location of the subject vehicle.

In other features, determining whether the sensor data indicates that the first vehicle is within a threshold distance of the subject vehicle further includes retrieving location data associated with the first vehicle from the remote computing system, determining a distance between the subject vehicle and the first vehicle based on the location of the subject vehicle and the location data associated with the first vehicle, and determining whether the first vehicle is located within the threshold distance of the subject vehicle based on the distance.

In other features, selectively activating the at least one camera of the subject vehicle further includes retrieving trajectory data associated with the first vehicle from the remote computing system, identifying a set of the at least one camera based on the location of the first vehicle and the trajectory data, and activating the set of the at least one camera.

In other features, the sensor is an impact sensor and the sensor data represents an applied force to the subject vehicle.

In other features, selectively activating the at least one camera of the subject vehicle further includes determining a contact location of the subject vehicle based on the sensor data, determining a location of the first vehicle based on the contact location, identifying a set of the at least one camera based on the location of the first vehicle, and activating the set of the at least one camera.

In other features, the remote computing system is configured to generate a cleanliness score of the first vehicle based on the image data and, in response to the cleanliness score being greater than a threshold value, generate an alert that is configured to indicate that the first vehicle needs to be cleaned.

In other features, the instructions further include determining whether the image data corresponds to image information of a vehicle-sharing account associated with the subject vehicle and, in response to (i) the image data not corresponding to the image information of the vehicle-sharing account and (ii) a vehicle state of the subject vehicle being associated with a first condition, identifying the subject vehicle as stolen.

In other features, the instructions further include obtaining a location of a user, in response to the user being located within a second threshold distance of the subject vehicle, selectively activating at least one camera of the subject vehicle, obtaining image data associated with an exterior of the vehicle from the at least one camera, and, in response to the image data indicating that the user is approaching the subject vehicle, activating an engine of the subject vehicle.

In other features, the at least one camera is located on an exterior of the subject vehicle The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A method comprising:
    obtaining, using a processor configured to execute instructions stored in a nontransitory computer-readable medium, sensor data from at least one sensor of a subject vehicle;
    determining, using the processor, whether the sensor data indicates one of (i) a first vehicle has contacted the subject vehicle and (ii) the first vehicle is located within a threshold distance of the subject vehicle;
    selectively activating, using the processor and in response to one of (i) the first vehicle contacting the subject vehicle and (ii) the first vehicle being located within the threshold distance, at least one camera of the subject vehicle;
    obtaining, using the processor, image data of the first vehicle from the at least one camera;
    transmitting, using the processor, the image data to a remote computing system;
    generating, using the remote computing system, a cleanliness score of the first vehicle based on the image data; and
    generating, using the remote computing system and in response to the cleanliness score being greater than a threshold value, an alert that is configured to indicate that the first vehicle needs to be cleaned.

2. The method of claim 1, wherein:
    the sensor is a global navigation satellite system sensor; and the sensor data represents a location of the subject vehicle.

3. The method of claim 2, wherein determining whether the sensor data indicates that the first vehicle is within a threshold distance of the subject vehicle further comprises:
retrieving, using the processor, location data associated with the first vehicle from the remote computing system;
determining, using the processor, a distance between the subject vehicle and the first vehicle based on the location of the subject vehicle and the location data associated with the first vehicle; and
determining, using the processor, whether the first vehicle is located within the threshold distance of the subject vehicle based on the distance.

4. The method of claim 3, wherein selectively activating the at least one camera of the subject vehicle further comprises:
retrieving, using the processor, trajectory data associated with the first vehicle from the remote computing system;
identifying, using the processor, a set of the at least one camera based on the location of the first vehicle and the trajectory data; and
activating, using the processor, the set of the at least one camera.

5. The method of claim 1, wherein:
the sensor is an impact sensor; and
the sensor data represents an applied force to the subject vehicle.

6. The method of claim 1, wherein selectively activating the at least one camera of the subject vehicle further comprises:
determining, using the processor, a contact location of the subject vehicle based on the sensor data;
determining, using the processor, a location of the first vehicle based on the contact location;
identifying, using the processor, a set of the at least one camera based on the location of the first vehicle; and
activating, using the processor, the set of the at least one camera.

7. The method of claim 1, further comprising:
determining, using the processor, whether the image data corresponds to image information of a vehicle-sharing account associated with the subject vehicle; and
identifying, using the processor and in response to (i) the image data not corresponding to the image information of the vehicle-sharing account and (ii) a vehicle state of the subject vehicle being associated with a first condition, the subject vehicle as stolen.

8. The method of claim 1, further comprising:
obtaining, using the processor, a location of a user;
selectively activating, using the processor and in response to the user being located within a second threshold distance of the subject vehicle, at least one camera of the subject vehicle;
obtaining, using the processor, image data associated with an exterior of the vehicle from the at least one camera; and
activating, using the processor and in response to the image data indicating that the user is approaching the subject vehicle, an engine of the subject vehicle.

9. The method of claim 1, wherein the at least one camera is located on an exterior of the subject vehicle.

10. A system comprising:
a processor configured to execute instructions stored in a nontransitory computer-readable medium, wherein the instructions include:
obtaining sensor data from at least one sensor of a subject vehicle;
determining whether the sensor data indicates one of (i) a first vehicle has contacted the subject vehicle and (ii) the first vehicle is located within a threshold distance of the subject vehicle;
in response to one of (i) the first vehicle contacting the subject vehicle and (ii) the first vehicle being located within the threshold distance, selectively activating at least one camera of the subject vehicle;
obtaining image data of the first vehicle from the at least one camera; and
transmitting, using the processor, the image data to a remote computing system;
wherein the remote computing system is configured to:
generate a cleanliness score of the first vehicle based on the image data; and
in response to the cleanliness score being greater than a threshold value, generate an alert that is configured to indicate that the first vehicle needs to be cleaned.

11. The system of claim 10, wherein:
the sensor is a global navigation satellite system sensor; and
the sensor data represents a location of the subject vehicle.

12. The system of claim 11, wherein determining whether the sensor data indicates that the first vehicle is within a threshold distance of the subject vehicle further comprises:
retrieving location data associated with the first vehicle from the remote computing system;
determining a distance between the subject vehicle and the first vehicle based on the location of the subject vehicle and the location data associated with the first vehicle; and
determining whether the first vehicle is located within the threshold distance of the subject vehicle based on the distance.

13. The system of claim 12, wherein selectively activating the at least one camera of the subject vehicle further comprises:
retrieving trajectory data associated with the first vehicle from the remote computing system;
identifying a set of the at least one camera based on the location of the first vehicle and the trajectory data; and
activating the set of the at least one camera.

14. The system of claim 10, wherein:
the sensor is an impact sensor; and
the sensor data represents an applied force to the subject vehicle.

15. The system of claim 10, wherein selectively activating the at least one camera of the subject vehicle further comprises:
determining a contact location of the subject vehicle based on the sensor data;
determining a location of the first vehicle based on the contact location;
identifying a set of the at least one camera based on the location of the first vehicle; and
activating the set of the at least one camera.

16. The system of claim 10, wherein the instructions further comprise:
determining whether the image data corresponds to image information of a vehicle-sharing account associated with the subject vehicle; and
in response to (i) the image data not corresponding to the image information of the vehicle-sharing account and (ii) a vehicle state of the subject vehicle being associated with a first condition, identifying the subject vehicle as stolen.

17. The system of claim 10, wherein the instructions further comprise:

obtaining a location of a user;

in response to the user being located within a second threshold distance of the subject vehicle, selectively activating at least one camera of the subject vehicle;

obtaining image data associated with an exterior of the vehicle from the at least one camera; and in response to the image data indicating that the user is approaching the subject vehicle, activating an engine of the subject vehicle.

18. The system of claim 10, wherein the at least one camera is located on an exterior of the subject vehicle.

19. A method comprising:

obtaining, using a processor configured to execute instructions stored in a nontransitory computer-readable medium, sensor data from at least one sensor of a subject vehicle;

determining, using the processor, whether the sensor data indicates one of (i) a first vehicle has contacted the subject vehicle and (ii) the first vehicle is located within a threshold distance of the subject vehicle;

selectively activating, using the processor and in response to one of (i) the first vehicle contacting the subject vehicle and (ii) the first vehicle being located within the threshold distance, at least one camera of the subject vehicle;

obtaining, using the processor, image data of the first vehicle from the at least one camera;

transmitting, using the processor, the image data to a remote computing system;

obtaining, using the processor, a location of a user;

selectively activating, using the processor and in response to the user being located within a second threshold distance of the subject vehicle, at least one camera of the subject vehicle;

obtaining, using the processor, image data associated with an exterior of the vehicle from the at least one camera; and activating, using the processor and in response to the image data indicating that the user is approaching the subject vehicle, an engine of the subject vehicle.

* * * * *